United States Patent
Ladd et al.

(10) Patent No.: US 11,745,265 B2
(45) Date of Patent: Sep. 5, 2023

(54) METAL DROP EJECTING THREE-DIMENSIONAL (3D) OBJECT PRINTER AND METHOD OF OPERATION FOR FACILITATING BUILD AND RELEASE OF A METAL OBJECT FROM A BUILD PLATFORM

(71) Applicant: Xerox Corporation, Norwalk, CT (US)

(72) Inventors: Collin A. Ladd, Charlotte, NC (US); Paul J. McConville, Webster, NY (US); Mariusz Mika, Raleigh, NC (US); Kareem Tawil, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/457,346

(22) Filed: Dec. 2, 2021

(65) Prior Publication Data

US 2023/0173580 A1    Jun. 8, 2023

(51) Int. Cl.
| | |
|---|---|
| *B22F 10/22* | (2021.01) |
| *B33Y 10/00* | (2015.01) |
| *B33Y 30/00* | (2015.01) |
| *B22F 12/50* | (2021.01) |
| *B22D 23/00* | (2006.01) |

(52) U.S. Cl.
CPC ............ *B22F 10/22* (2021.01); *B22D 23/003* (2013.01); *B22F 12/50* (2021.01); *B33Y 10/00* (2014.12); *B33Y 30/00* (2014.12); *B22F 2301/052* (2013.01); *B22F 2302/45* (2013.01)

(58) Field of Classification Search
None
See application file for complete search history.

(56) References Cited

U.S. PATENT DOCUMENTS

| 7,143,812 B2 | 12/2006 | Bahaychick et al. |
| 2017/0252830 A1* | 9/2017 | Sachs ...................... B22F 12/90 |
| 2017/0348912 A1* | 12/2017 | Hirschberg ........... B29C 64/245 |

FOREIGN PATENT DOCUMENTS

CN    110721869 A  *  1/2020

OTHER PUBLICATIONS

Sukhotskiy et al. "Magnetohydrodynamic Drop-on-Demand Liquid Metal 3D Printing". Solid Freeform Fabrication 2017: Proceedings of the 28th Annual International Solid Freeform Fabrication Symposium, pp. 1806-1810 (2017). (Year: 2017).*

* cited by examiner

*Primary Examiner* — Alexander M Weddle
(74) *Attorney, Agent, or Firm* — Maginot Moore & Beck LLP

(57) ABSTRACT

A three-dimensional (3D) metal object manufacturing apparatus is equipped with a liquid silicate application system to apply liquid silicate to a surface of a build platform prior to manufacture of a metal object. The liquid silicate layer is permitted to air dry and then the platform is heated to its operational temperature range for formation of a metal object with melted metal drops ejected by the apparatus. The liquid silicate layer forms a glassy, brittle layer on which the metal object is formed. This brittle layer is removed relatively easily with the object after the object is manufactured and the build platform is permitted to cool. The silicate layer improves the wetting of the surfaces of build platforms made with non-wetting materials, such as oxidized steel, while also preventing metal-to-metal welds with wetting materials, such as tungsten or nickel.

8 Claims, 4 Drawing Sheets

METAL DROP EJECTING THREE-DIMENSIONAL (3D) OBJECT PRINTER AND METHOD OF OPERATION FOR FACILITATING BUILD AND RELEASE OF A METAL OBJECT FROM A BUILD PLATFORM

TECHNICAL FIELD

This disclosure is directed to three-dimensional (3D) object printers that eject melted metal drops to form objects and, more particularly, to the formation of a base layer of a metal object on a build platform in such printers.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject UV-curable materials, such as photopolymers or elastomers, while other technologies melt an elastomer and extrude the thermoplastic material into object layers. The printer typically operates one or more ejectors or extruders to form successive layers of plastic or thermoplastic material to construct a three-dimensional printed object with a variety of shapes and structures. After each layer of the three-dimensional printed object is formed, the plastic material is UV cured and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D objects. These printers have a source of solid metal, such as a roll of wire or pellets, that feeds solid metal into a heated receptacle of a vessel in the printer where the solid metal is melted and the melted metal fills the receptacle. The receptacle is made of non-conductive material around which an electrical wire is wrapped to form a coil. An electrical current is passed through the coil to produce an electromagnetic field that causes the meniscus of the melted metal at a nozzle of the receptacle to separate from the melted metal within the receptacle and be propelled from the nozzle. A build platform is positioned to receive the ejected melted metal drops from the nozzle of the ejector and this platform is moved in a X-Y plane parallel to the plane of the platform by a controller operating actuators. These ejected metal drops form metal layers of an object on the platform and another actuator is operated by the controller to alter the distance between the ejector and the platform to maintain an appropriate distance between the ejector and the most recently printed layer of the metal object being formed. This type of metal drop ejecting printer is also known as a magnetohydrodynamic (MHD) printer.

During the printing process performed with a MHD printer, the first layer of the object must adhere securely to the surface of the build platform. Without this adherence, the base of the object does not remain stable as the size of the object increases. The high temperature of the surface of the build platform can cause the surface of the build platform to become very highly oxidized. This oxidation layer can interfere with the adherence of the object base layer to the build platform and the object may prematurely release from the build platform surface during printing. Additionally, the oxidation layer can cause the base layer of the object to form non-uniformly so the base layer has a porosity that is higher than that required for stable object layer printing.

Oxidation of the build platform surface, however, is not the only issue affecting appropriate adherence of the object to the build platform. A relatively clean build platform surface can result in the base layer of the object bonding too well to the build platform surface. While the manufacture of the object proceeds well since the base of the object is very stable, removal of the object at the end of the process can be very difficult. In some cases, the attachment of the object to the build platform is so secure that removal of the object causes damage to the object, the build platform, or both. Being able to adhere the base layer to the build platform sufficiently to form that layer uniformly and with the appropriate porosity without so securely attaching the object to the build platform that its removal results in damage to the object, the platform, or both would be beneficial.

SUMMARY

A new method of operating a 3D metal object printer adheres the base layer of a metal object to the build platform sufficiently to form that layer uniformly and with the appropriate porosity without so securely attaching the object to the build platform that its removal results in damage to the object, the platform, or both. The method includes operating an applicator to apply silicate to a planar member, and operating an ejector head to eject melted metal drops onto the planar member after the liquid silicate is applied to the planar member.

A new 3D metal object printer adheres the base layer of a metal object to the build platform sufficiently to form that layer uniformly and with the appropriate porosity without so securely attaching the object to the build platform that its removal results in damage to the object, the platform, or both. The new 3D metal object printer includes an ejector head having a vessel with a receptacle within the vessel that is configured to hold melted metal, a planar member, and an applicator configured to apply a silicate material on the planar member to receive the melted metal drops ejected from the ejector head.

BRIEF DESCRIPTION OF THE DRAWINGS

The foregoing aspects and other features of a method for operating a 3D metal object printer that adheres the base layer of a metal object to the build platform sufficiently to form that layer uniformly and with the appropriate porosity without so securely attaching the object to the build platform that its removal results in damage to the object, the platform, or both and a 3D metal object printer that implements the method are explained in the following description, taken in connection with the accompanying drawings.

DETAILED DESCRIPTION

Figure 1:
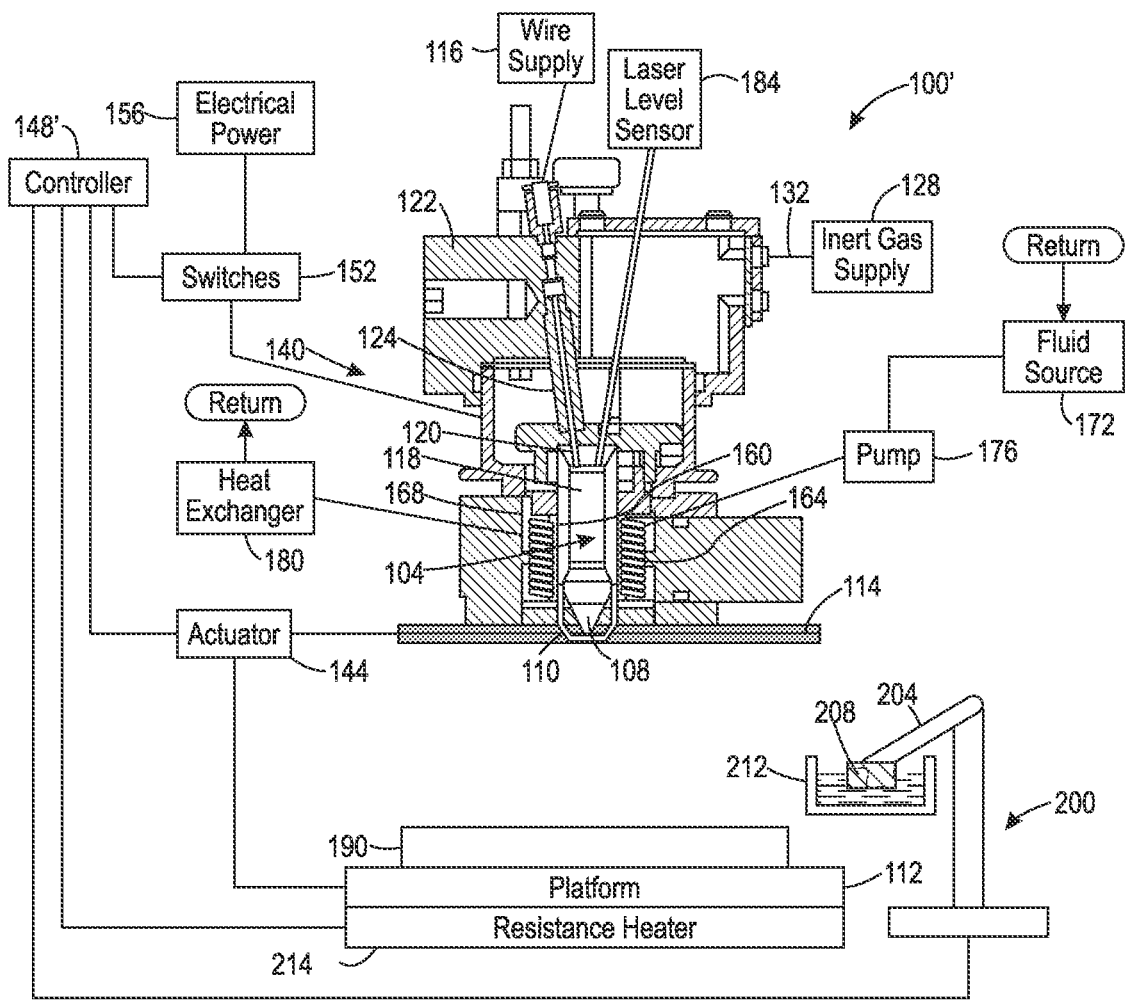
FIG. 1 depicts a new 3D metal object printer that adheres the base layer of a metal object to a metal foil layer on a build platform sufficiently to form the base layer uniformly and with the appropriate porosity without so securely attaching the object to the build platform that its removal results in damage to the object, the platform, or both.

For a general understanding of the environment for the 3D metal object printer and its operation as disclosed herein as well as the details for the printer and its operation, reference is made to the drawings. In the drawings, like reference numerals designate like elements.

Figure 4:
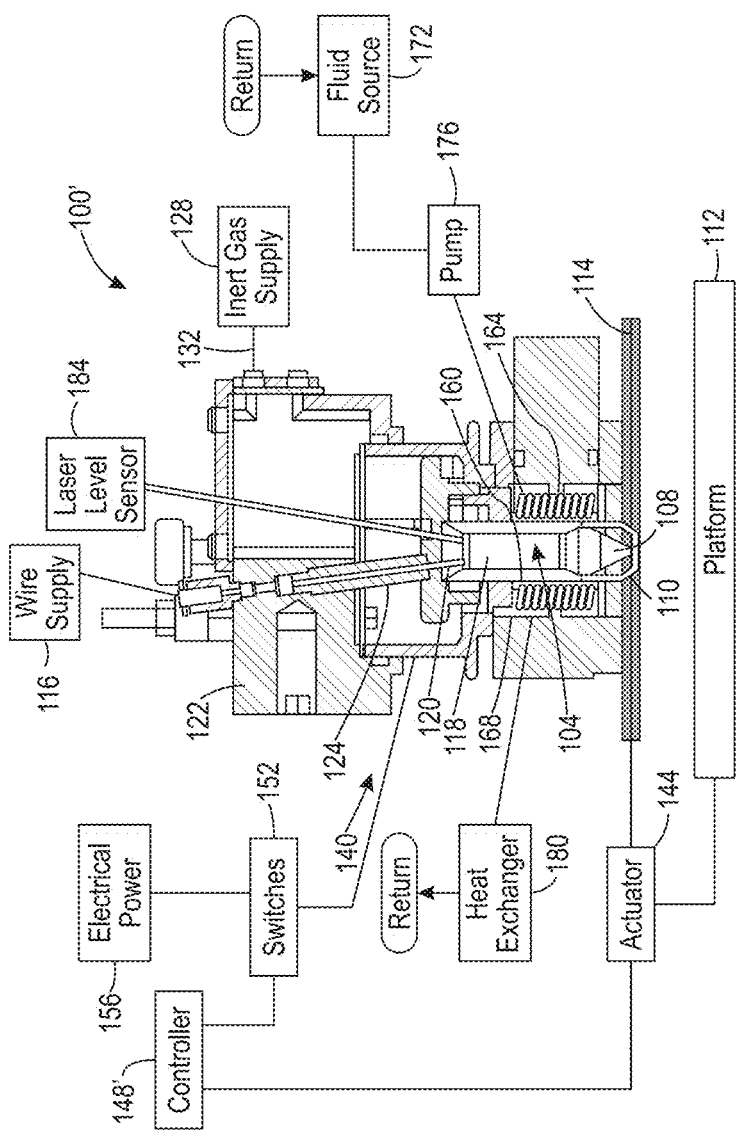
FIG. 4 is a schematic diagram of a prior art 3D metal printer that does not include an applicator for applying a silicate layer to the surface of a build platform before forming the base layer of a metal object on the build platform.

FIG. 4 illustrates an embodiment of a previously known 3D metal object printer 100 that ejects drops of a melted metal to form a metal object directly on a build platform. In the printer of FIG. 4, drops of melted bulk metal are ejected from a receptacle of a removable vessel 104 having a single nozzle 108 and drops from the nozzle form a base layer of an object with swaths applied directly to a build platform 112. As used in this document, the term "removable vessel" means a hollow container having a receptacle configured to hold a liquid or solid substance and the container as a whole is configured for installation and removal in a 3D metal object printer. As used in this document, the term "vessel" means a hollow container having a receptacle configured to hold a liquid or solid substance that may be configured for installation and removal from a 3D object metal printer. As used in this document, the term "bulk metal" means conductive metal available in aggregate form, such as wire of a commonly available gauge, pellets of macro-sized proportions, and metal powder.

With further reference to FIG. 4, a source of bulk metal 116, such as metal wire 120, is fed into a wire guide 124 that extends through the upper housing 122 in the ejector head 140 and melted in the receptacle of the removable vessel 104 to provide melted metal for ejection from the nozzle 108 through an orifice 110 in a baseplate 114 of the ejector head 140. As used in this document, the term "nozzle" means an orifice fluidically connected to a volume within a receptacle of a vessel containing melted metal that is configured for the expulsion of melted metal drops from the receptacle within the vessel. As used in this document, the term "ejector head" means the housing and components of a 3D metal object printer that melt, eject, and regulate the ejection of melted metal drops for the production of metal objects. A melted metal level sensor 184 includes a laser and a reflective sensor. The reflection of the laser off the melted metal level is detected by the reflective sensor, which generates a signal indicative of the distance to the melted metal level. The controller receives this signal and determines the level of the volume of melted metal in the removable vessel 104 so it can be maintained at an appropriate level 118 in the receptacle of the removable vessel. The removable vessel 104 slides into the heater 160 so the inside diameter of the heater contacts the removable vessel and can heat solid metal within the receptacle of the removable vessel to a temperature sufficient to melt the solid metal. As used in this document, the term "solid metal" means a metal as defined by the periodic chart of elements or alloys formed with these metals in solid rather than liquid or gaseous form. The heater is separated from the removable vessel to form a volume between the heater and the removable vessel 104. An inert gas supply 128 provides a pressure regulated source of an inert gas, such as argon, to the ejector head through a gas supply tube 132. The gas flows through the volume between the heater and the removable vessel and exits the ejector head around the nozzle 108 and the orifice 110 in the baseplate 114. This flow of inert gas proximate to the nozzle insulates the ejected drops of melted metal from the ambient air at the baseplate 114 to prevent the formation of metal oxide during the flight of the ejected drops. A gap between the nozzle and the surface on which an ejected metal drop lands is intentionally kept small enough that the inert gas exiting around the nozzle does not dissipate before the drop within this inert gas flow lands.

The ejector head 140 is movably mounted within Z-axis tracks for movement of the ejector head with respect to the platform 112. One or more actuators 144 are operatively connected to the ejector head 140 to move the ejector head along a Z-axis and are operatively connected to the platform 112 to move the platform in an X-Y plane beneath the ejector head 140. The actuators 144 are operated by a controller 148 to maintain an appropriate distance between the orifice 110 in the baseplate 114 of the ejector head 140 and a surface of an object on the platform 112. The build platform in some versions of the system 100 consists essentially of oxidized steel, while in others the oxidized steel has an upper surface coating of tungsten or nickel. The oxidized steel version of the platform is not as likely to bond too strongly to the base layer of the melted aluminum since it is not readily wetted by melted aluminum. While this platform is advantageous for removal of the object after it is manufactured, it may not be adequately strong enough to support formation of the object during the entire process. To address this issue, other versions of the platform add tungsten or nickel surfaces to the platform to improve the wetting of the build surface with the melted aluminum. These versions of the platform, however, can adhere too firmly to the base layer of the metal object and result in metal-to-metal welds that cause damage to the object, the surface of the build platform, or both, when the object is removed.

Moving the platform 112 in the X-Y plane as drops of molten metal are ejected toward the platform 112 forms a swath of melted metal drops on the object being formed. Controller 148 also operates actuators 144 to adjust the distance between the ejector head 140 and the most recently formed layer on the substrate to facilitate formation of other structures on the object. While the molten metal 3D object printer 100 is depicted in FIG. 4 as being operated in a vertical orientation, other alternative orientations can be employed. Also, while the embodiment shown in FIG. 4 has a platform that moves in an X-Y plane and the ejector head moves along the Z axis, other arrangements are possible. For example, the actuators 144 can be configured to move the ejector head 140 in the X-Y plane and along the Z axis or they can be configured to move the platform 112 in both the X-Y plane and Z-axis.

A controller 148 operates the switches 152. One switch 152 can be selectively operated by the controller to provide electrical power from source 156 to the heater 160, while another switch 152 can be selectively operated by the controller to provide electrical power from another electrical source 156 to the coil 164 for generation of the electrical field that ejects a drop from the nozzle 108. Because the heater 160 generates a great deal of heat at high temperatures, the coil 164 is positioned within a chamber 168 formed by one (circular) or more walls (rectilinear shapes) of the ejector head 140. As used in this document, the term "chamber" means a volume contained within one or more walls within a metal drop ejecting printer in which a heater, a coil, and a removable vessel of a 3D metal object printer are located. The removable vessel 104 and the heater 160 are located within such a chamber. The chamber is fluidically connected to a fluid source 172 through a pump 176 and also fluidically connected to a heat exchanger 180. As used in this document, the term "fluid source" refers to a container of a liquid having properties useful for absorbing heat. The heat exchanger 180 is connected through a return to the fluid source 172. Fluid from the source 172 flows through the chamber to absorb heat from the coil 164 and the fluid carries the absorbed heat through the exchanger 180, where the heat is removed by known methods. The cooled fluid is returned to the fluid source 172 for further use in maintaining the temperature of the coil in an appropriate operational range.

The controller 148 of the 3D metal object printer 100 requires data from external sources to control the printer for metal object manufacture. In general, a three-dimensional model or other digital data model of the object to be formed is stored in a memory operatively connected to the controller 148. The controller can selectively access the digital data model through a server or the like, a remote database in which the digital data model is stored, or a computer-readable medium in which the digital data model is stored. This three-dimensional model or other digital data model is processed by a slicer implemented with the controller to generate machine-ready instructions for execution by the controller 148 in a known manner to operate the components of the printer 100 and form the metal object corresponding to the model. The generation of the machine-ready instructions can include the production of intermediate models, such as when a CAD model of the device is converted into an STL data model, a polygonal mesh, or other intermediate representation, which in turn can be processed to generate machine instructions, such as g-code, for fabrication of the object by the printer. As used in this document, the term "machine-ready instructions" means computer language commands that are executed by a computer, microprocessor, or controller to operate components of a 3D metal object additive manufacturing system to form metal objects on the platform 112. The controller 148 executes the machine-ready instructions to control the ejection of the melted metal drops from the nozzle 108, the positioning of the platform 112, as well as maintaining the distance between the orifice 110 and a surface of the object on the platform 112.

Using like reference numbers for like components and removing some of the components not used to stabilize the object during formation without attaching the object too rigidly to the platform 112, a new 3D metal object printer 100' is shown in FIG. 1. The printer 100' includes an silicate layer application system 200 as well as a controller 148' configured with programmed instructions stored in a non-transitory memory connected to the controller. The controller 148' executes programmed instructions to operate the application system 200 as described below to form a silicate layer that is heated to form a brittle layer adequate to support production of a metal object by the system. The silicate layer can be a liquid solution or a powder. After production of the object, the object and the portion of the brittle layer that supports the object can be removed from the build platform 112 without damage to the object or the platform.

Application system 200 includes an articulated arm 204 that holds an applicator 208 that resides in a reservoir 212. In one embodiment, the reservoir 212 contains a solution of sodium silicate. The applicator 208 is a porous material, such as felt or a ceramic material, that absorbs the solution in the reservoir. Additionally, a brush or sprayer can be used to apply the solution or a powder. The articulated arm is operatively connected to the controller 148' so the controller can operate the arm to lift the applicator from the reservoir and apply a layer of liquid silicate to the platform 112 before returning the applicator to the reservoir (Step 1, FIG. 2). As used in this document, the term "liquid silicate" means an aqueous solution of a conjugate salt of any water soluble silicic acid. In one embodiment, the liquid silicate is an aqueous solution of sodium silicate ranging from 1-40 wt % of pure sodium silicate, lithium silicate, or potassium silicate. The aqueous solution of liquid silicate can include a surfactant, such as sodium dodecyl sulfate, for wetting. The liquid silicate layer is left to dry in the ambient air so a solid silicate hydrate layer remains (Step 2, FIG. 2). The controller 148' operates the resistance heater 214 to raise the temperature of the build platform to a temperature above 100° C. to prepare the platform for the ejection of melted aluminum drops. In one embodiment, the build platform is raised to a temperature in the about 400° C. to about 500° C. range. This temperature range also drives out the remaining water in the silicate layer and condenses the silicate into an insoluble glassy layer (Step 3, FIG. 2). The melted aluminum or aluminum alloy drops have a temperature above 660° C. When these melted aluminum drops encounter the glassy layer, they reactively wet the layer and bond to the brittle silicate layer through a partial redox reaction (Step 4, FIG. 2). After manufacture of the metal object and the removal of active heat to the build platform, the object and platform cool to a temperature of about 500° C. or less so the object and the portion of the brittle silicate layer can be mechanically separated from the build platform without damage to the object or to the platform 112 (Step 5, FIG. 2).

Figure 2:
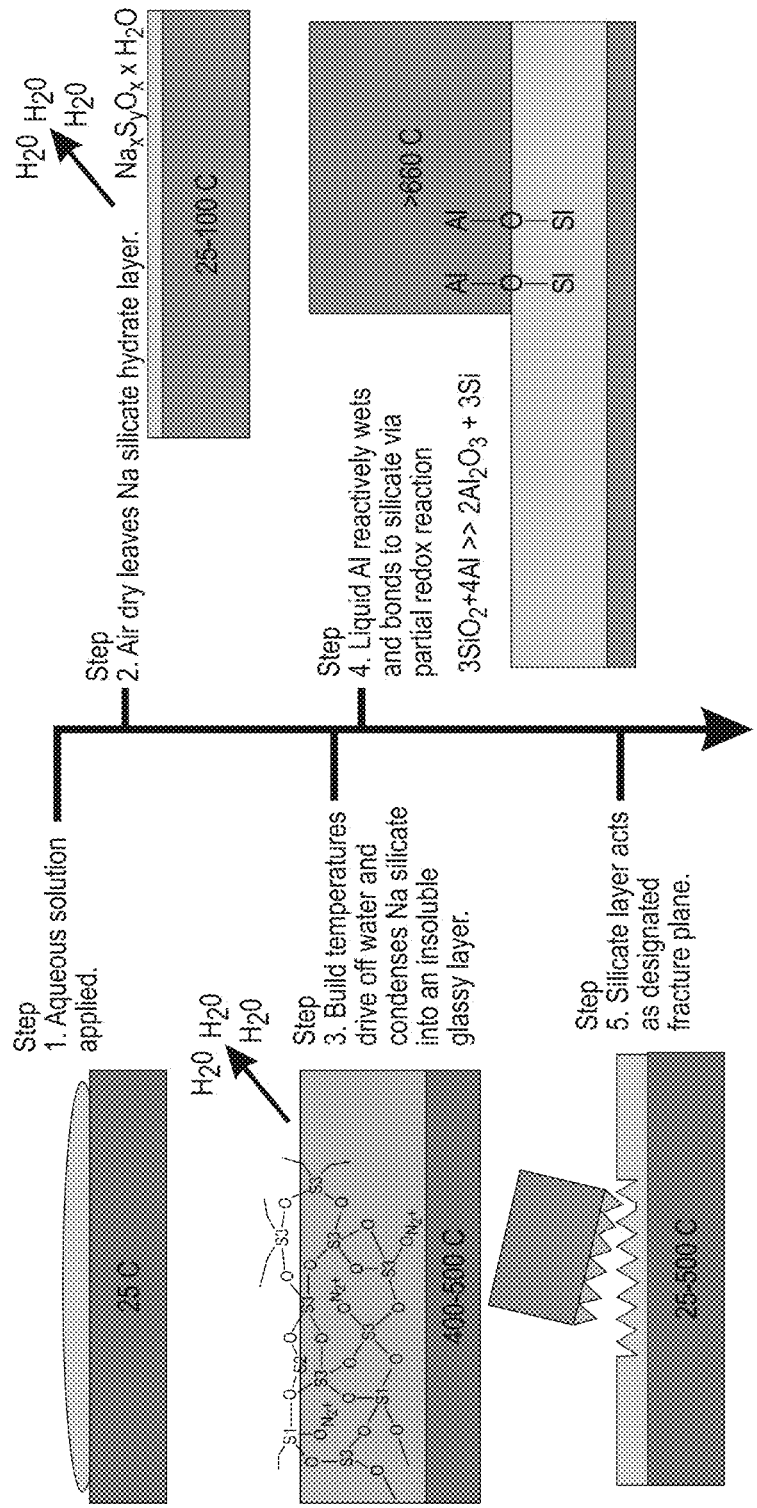
FIG. 2 is a schematic diagram of a process that provides sufficient adhesion of the build material to the build platform for a reliable foundation for building the part without so securely attaching the object to the build platform that its removal results in damage to the object, the platform, or both.

In the system and method described with reference to FIG. 1 and FIG. 2, the silicate layer promotes melted aluminum wetting and adhesion with respect to nonwetting and less intense bonding substrates, such as oxidized steel as noted previously. It also reduces the degree of bonding between melted aluminum and strongly bonding substrates, such as nickel or tungsten as noted previously. Thus, the silicate release layer promotes wetting and adhesion with build platforms that need more wetting and adhesion and attenuates wetting and adhesion with build platforms that need less wetting and adhesion. With both types of build platforms, the silicate layer produces a fracture plane effective for facilitating removal of the metal object from most build platforms.

The controller 148' can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 148' from either a scanning system or an online or work station connection for processing and generation of the signals that operate the components of the printer 100' to form an object on the platform 112.

Figure 3:
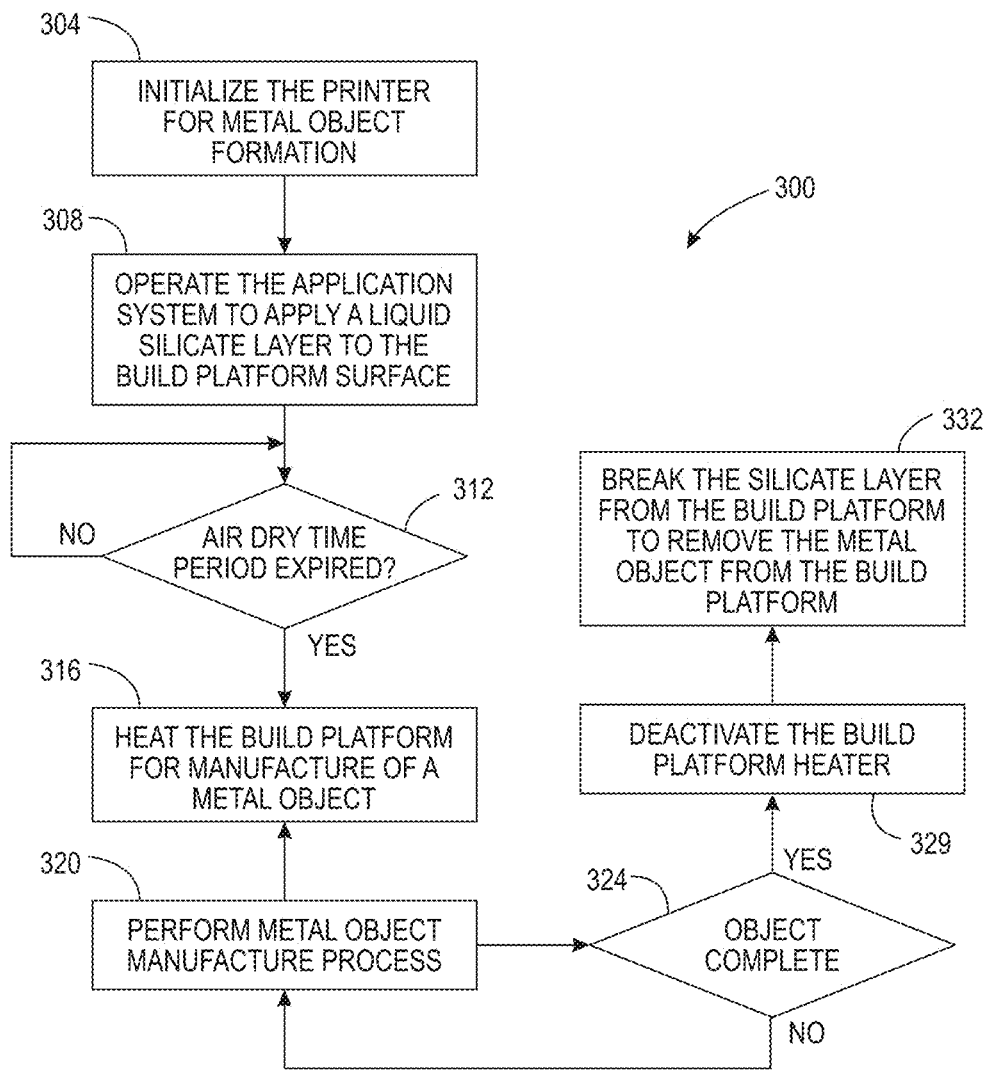
FIG. 3 is a flow diagram of a process for operating the system of FIG. 1 that provides sufficient adhesion of the build material to the build platform for a reliable foundation for building the part without so securely attaching the object to the build platform that its removal results in damage to the object, the platform, or both.

A process for operating the 3D metal object printer 100' to form a metal object on a surface of a silicate layer formed on the build platform 112 is shown in FIG. 3. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 148' noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 3 is a flow diagram for a process 300 that operates the application system 200 to form a silicate layer on the build platform 112 before formation of a metal object with the printer 100'. The controller 148' is configured to execute programmed instructions stored in a non-transitory memory operatively connected to the controller to operate the application system 200 for this purpose. After the printer is initialized (block 304), the articulated arm is operated to move the applicator from the reservoir across the build platform surface and back to the reservoir (block 308). An appropriate period of time is waited to permit the liquid silicate layer to air dry so no silicate hydrate layer remains (block 312). The heater for the build platform is operated to heat the build platform to a temperature in a range sufficient for production of a metal object (block 316). The resulting heat drives the remaining water out of the silicate layer so the silicate condenses into a glassy, brittle layer. During the object manufacturing process (block 320), the melted aluminum reactively wets and bonds to the condensed silicate layer. After the object formation is completed (block 324), the heater for the build platform is deactivated (block 328) and the object and build platform cools to a temperature in the range of about 25° C. to about 500° C. range so the object and the portion of the brittle silicate layer can be mechanically separated from the build platform without damage to the object or to the platform 112 (block 332).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A metal drop ejecting apparatus comprising:
   an ejector head having a vessel with a receptacle within the vessel that is configured to hold melted metal;
   a planar member;
   a heater configured to heat the planar member;
   a reservoir configured to hold a volume of a material;
   an articulated arm to which an applicator is operatively connected; and
   a controller operatively connected to the ejector head, the articulated arm, and the heater, the controller being configured to:
      operate the articulated arm to move the applicator from a first position within the reservoir to a position outside of the reservoir and opposite the planar member, to move the applicator across a surface of the planar member to apply the material to the surface of the planar member, and to return the applicator to the first position within the reservoir;
      wait a predetermined period of time after the solution is applied to the surface of the planar member by the applicator;
      after expiration of the predetermined period of time, operate the heater to raise a temperature of the planar member to a temperature that forms an insoluble layer of the material on the surface of the planar member; and
      operate the ejector head to eject drops of melted metal from the receptacle in the vessel toward the insoluble layer of the material on the planar member while the heater is operated to keep the planar member at or above the temperature at which the insoluble layer of material was formed on the planar member.

2. The apparatus of claim 1 wherein the material is a silicate powder.

3. The apparatus of claim 1 wherein the material is a liquid silicate.

4. The apparatus of claim 1 wherein the applicator is comprised essentially of a porous material.

5. The apparatus of claim 4 wherein the porous material is comprised essentially of felt or a ceramic material.

6. The apparatus of claim 1 wherein the temperature to which the planar member is heated is above 100° C.

7. The apparatus of claim 6 wherein the temperature to which the planar member is heated is within a range of about 400° C. to about 500° C.

8. The apparatus of claim 7 wherein the ejector head is configured to eject drops of melted aluminum or aluminum alloys at a temperature of at least 660° C.

\* \* \* \* \*